(12) United States Patent
Choi (10) Patent No.: US 11,052,853 B2
(45) Date of Patent: Jul. 6, 2021

(54) PASSENGER PROTECTION SYSTEM FOR VEHICLE

(71) Applicants: HYUNDAI MOTOR COMPANY, Seoul (KR); KIA MOTORS CORPORATION, Seoul (KR)

(72) Inventor: Jae Ho Choi, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 129 days.

(21) Appl. No.: 16/411,649

(22) Filed: May 14, 2019

(65) Prior Publication Data

US 2020/0180537 A1 Jun. 11, 2020

(30) Foreign Application Priority Data

Dec. 6, 2018 (KR) .......................... 10-2018-0156089

(51) Int. Cl.
| | |
|---|---|
| *B60R 21/0134* | (2006.01) |
| *B60R 21/205* | (2011.01) |
| *B60R 21/207* | (2006.01) |
| *B60R 21/21* | (2011.01) |
| *B60R 21/232* | (2011.01) |
| *B60R 21/18* | (2006.01) |

(Continued)

(52) U.S. Cl.
CPC .......... *B60R 21/0134* (2013.01); *B60R 21/18* (2013.01); *B60R 21/205* (2013.01); *B60R 21/207* (2013.01); *B60R 21/21* (2013.01); *B60R 21/232* (2013.01); *B60R 2021/0032* (2013.01); *B60R 2021/01013* (2013.01); *B60R 2021/01034* (2013.01); *B60R 2021/01231* (2013.01)

(58) Field of Classification Search
CPC . B60R 21/0134; B60R 21/207; B60R 21/232; B60R 2021/01231; B60R 2021/0032; B60R 2021/01034; B60R 21/015; B60R 21/18; B60R 21/21
See application file for complete search history.

(56) References Cited

U.S. PATENT DOCUMENTS

| | | | | |
|---|---|---|---|---|
| 5,626,359 | A * | 5/1997 | Steffens, Jr. | .......... B60R 21/013 180/268 |
| 10,252,693 | B2 * | 4/2019 | Numazawa | ............ B60N 2/143 |
| 10,589,706 | B2 * | 3/2020 | Nagasawa | ............. B60R 21/203 |

(Continued)

FOREIGN PATENT DOCUMENTS

| | | |
|---|---|---|
| KR | 10-2014-0071011 A | 6/2014 |
| WO | WO-2018167919 A1 * | 9/2018 ........... B60R 21/015 |

*Primary Examiner* — James A English
*Assistant Examiner* — Kurtis Nielson
(74) *Attorney, Agent, or Firm* — Brinks Gilson & Lione (57) ABSTRACT

A passenger protection system for a vehicle includes: a seat which slides forwards and backwards and rotates laterally, where the seat has a seat belt equipped with a belt airbag, and a side airbag provided on a side of a seatback of the seat; a front airbag provided in a front structure located in front of the seat of the vehicle to be deployed towards the seat; a curtain airbag provided in a pillar trim on an upper end of a vehicle door to be deployed downwards; and a controller to selectively deploy the belt airbag, the side airbag, the front airbag and the curtain airbag, depending on a sliding position and a rotating direction of the seat and a detection or a predicted direction of a vehicle collision.

13 Claims, 7 Drawing Sheets

(51) Int. Cl.
   *B60R 21/01*   (2006.01)
   *B60R 21/00*   (2006.01)

(56)             References Cited

U.S. PATENT DOCUMENTS

| | | | |
|---|---|---|---|
| 10,625,632 B2* | 4/2020 | Jaradi | B60N 2/10 |
| 10,696,265 B2* | 6/2020 | Shin | B60R 21/233 |
| 10,821,928 B2 | 11/2020 | Deng | B60R 21/01554 |
| 2002/0195805 A1* | 12/2002 | Chitalia | B60R 21/015 |
| | | | 280/734 |
| 2007/0102908 A1* | 5/2007 | Schuler | B60R 21/013 |
| | | | 280/732 |
| 2009/0322067 A1* | 12/2009 | Nezaki | B60R 22/26 |
| | | | 280/807 |
| 2014/0361521 A1* | 12/2014 | Fukawatase | B60R 21/01552 |
| | | | 280/730.1 |
| 2015/0258954 A1* | 9/2015 | Engelman | B60R 21/01556 |
| | | | 280/735 |
| 2016/0229370 A1* | 8/2016 | Hampson | B60R 21/23138 |
| 2016/0272141 A1* | 9/2016 | Ohmura | B60R 21/0134 |
| 2017/0210322 A1* | 7/2017 | Rao | B60N 2/01 |
| 2017/0247006 A1* | 8/2017 | Rao | B60R 21/18 |
| 2018/0065581 A1* | 3/2018 | Ohno | B60R 21/231 |
| 2019/0111880 A1* | 4/2019 | Choi | B60R 21/2338 |
| 2019/0283635 A1* | 9/2019 | Yetukuri | B60R 21/01554 |
| 2020/0094770 A1* | 3/2020 | Fischer | B60R 21/231 |
| 2020/0164827 A1* | 5/2020 | Oh | B60R 21/04 |

* cited by examiner

| | | head-on collision | | side collision | | oblique collision mode | |
|---|---|---|---|---|---|---|---|
| seat direction | | front | side | front | side | front | side |
| deployment of airbag | CAB | × | × | O (single) | O (dual) | O (single) | O (dual) |
| | SAB | × | × | O | × | O | × |
| | F-SAB | × | O (distance) | × | × | × | O (distance) |
| | AIR BELT | O (distance) | × | × | O | O (distance) | O |
| | PAB | O | O | × | × | O | O |

PASSENGER PROTECTION SYSTEM FOR VEHICLE

CROSS REFERENCE TO RELATED APPLICATION

The present application claims priority to and the benefit of Korean Patent Application No. 10-2018-0156089, filed on Dec. 6, 2018, the entire contents of which are incorporated herein by reference.

FIELD

The present disclosure relates to a passenger protection system for a vehicle, and more particularly to a passenger protection system using airbag apparatuses.

BACKGROUND

The statements in this section merely provide background information related to the present disclosure and may not constitute prior art.

In an autonomous vehicle, a driver and passengers may do various activities while staying in the vehicle. For example, they may change a position of a seat in the vehicle by rotating the seat, seeking more comfortable posture. In the case of the autonomous vehicle, the seat of the vehicle may provide a relaxing mode or be rotated to face a side, thus allowing passengers to perform various activities in various and comfortable postures.

However, we have discovered that a conventional vehicle does not provide the function of rotating the seat and instead only allows the sliding of the seat in a front-rear direction and the reclining of a seatback of the seat, so that it is difficult to secure the stability of a passenger in the event of a collision even when the seat provides the function of rotating the seat and/or a relaxing mode.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a passenger protection system for a vehicle, which allows a passenger to be protected through various airbag apparatuses even when a seat of the vehicle is rotated or in a relax mode.

According to one aspect of the present disclosure, a passenger protection system for a vehicle extending between forward and rearward directions includes: a seat configured to slide in the forward and rearward directions and to rotate laterally, where the seat includes a seat belt equipped with a belt airbag, and a side airbag provided on a side of a seatback of the seat; a front airbag provided in a front structure located in front of the seat and configured to be deployed towards the seat; a curtain airbag provided in a pillar trim on an upper end of a vehicle door and configured to be deployed downwards; and a controller configured to selectively deploy the belt airbag, the side airbag, the front airbag and the curtain airbag, based on a sliding position and a rotating direction of the seat as well as a detection of a vehicle collision or a predicted direction of the vehicle collision.

The belt airbag may be provided in each of a shoulder belt and a lap belt, and may be deployed to cause an airbag cushion part to be inflated towards a front of a passenger with respect to the seat belt.

Based on a direction where the seat faces a front of the vehicle, the side airbag may be mounted on a side of the seatback adjacent to the vehicle door, and a far-side airbag may be mounted on an opposite side of the seatback. In particular, the controller is configured to selectively deploy the belt airbag, the side airbag, the far-side airbag, the front airbag and the curtain airbag, based on the sliding position and the rotating direction of the seat as well as the detection of the vehicle collision or the predicted direction of the vehicle collision.

The curtain airbag may include a door-side chamber located adjacent to the vehicle door, and a passenger-side chamber disposed to overlap with a part of the door-side chamber which is on a passenger side.

The passenger-side chamber may be connected to the door-side chamber via a connection hole, and may be inflated by gas supplied from the door-side chamber.

The connection hole may be connected to an active tether and may be kept closed by tension of the active tether, and the controller may control to selectively deploy the passenger-side chamber by selectively releasing the tension from the active tether, depending on the rotating direction of the seat and the detection or the predicted direction of the vehicle collision when the curtain airbag is deployed.

The controller may control to deploy the front airbag when the seat is facing the front of the vehicle and the vehicle is in a head-on collision mode, and may control to deploy the belt airbag when a distance between the seat or a passenger on the seat and the front structure is greater than a predetermined distance, or when a reclining angle of the seatback is greater than a predetermined angle.

The controller may control to deploy the front airbag when the seat is facing the side adjacent to the vehicle door in the head-on collision mode, and may control to deploy the far-side airbag when a distance between the seat or the passenger and the front structure is greater than a predetermined distance, or when a reclining angle of the seatback is greater than a predetermined angle.

The controller may control to deploy the curtain airbag and the side airbag when the seat is facing the front of the vehicle in a side collision mode, and the curtain airbag may inhibit or prevent the passenger-side chamber from being deployed by maintaining the tension of the active tether.

The controller may control to deploy the curtain airbag when the seat is facing the vehicle door in the side collision mode, and the curtain airbag may allow both the passenger-side chamber and the door-side chamber to be deployed by releasing the tension from the active tether.

The controller may control to deploy both the curtain airbag and the belt airbag when the seat is facing the vehicle door in the side collision mode.

The controller may control to deploy the front airbag, the curtain airbag and the side airbag when the seat is facing the front of the vehicle in an oblique collision mode, and may control to deploy the belt airbag when a distance between the seat or the passenger on the seat and the front structure is greater than a predetermined distance, or when a reclining angle of the seatback is greater than a predetermined angle.

The controller may control to deploy the front airbag, the curtain airbag and the belt airbag when the seat is facing the vehicle door in an oblique collision mode.

The controller may control to deploy the front airbag, the curtain airbag and the belt airbag when the seat is facing the vehicle door in an oblique collision mode, and the curtain airbag may deploy both the passenger-side chamber and the door-side chamber by releasing the tension from the active tether.

The controller may control to deploy the front airbag, the curtain airbag and the belt airbag when the seat is facing the vehicle door in an oblique collision mode, and may control to deploy the far-side airbag when a distance between the seat or the passenger and the front structure is greater than a predetermined distance, or when a reclining angle of the seatback is greater than a predetermined angle.

According to the present disclosure, the passenger protection system for the vehicle allows a passenger to be securely protected through various airbag apparatuses even when the seat of the vehicle is rotated or in the relax mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
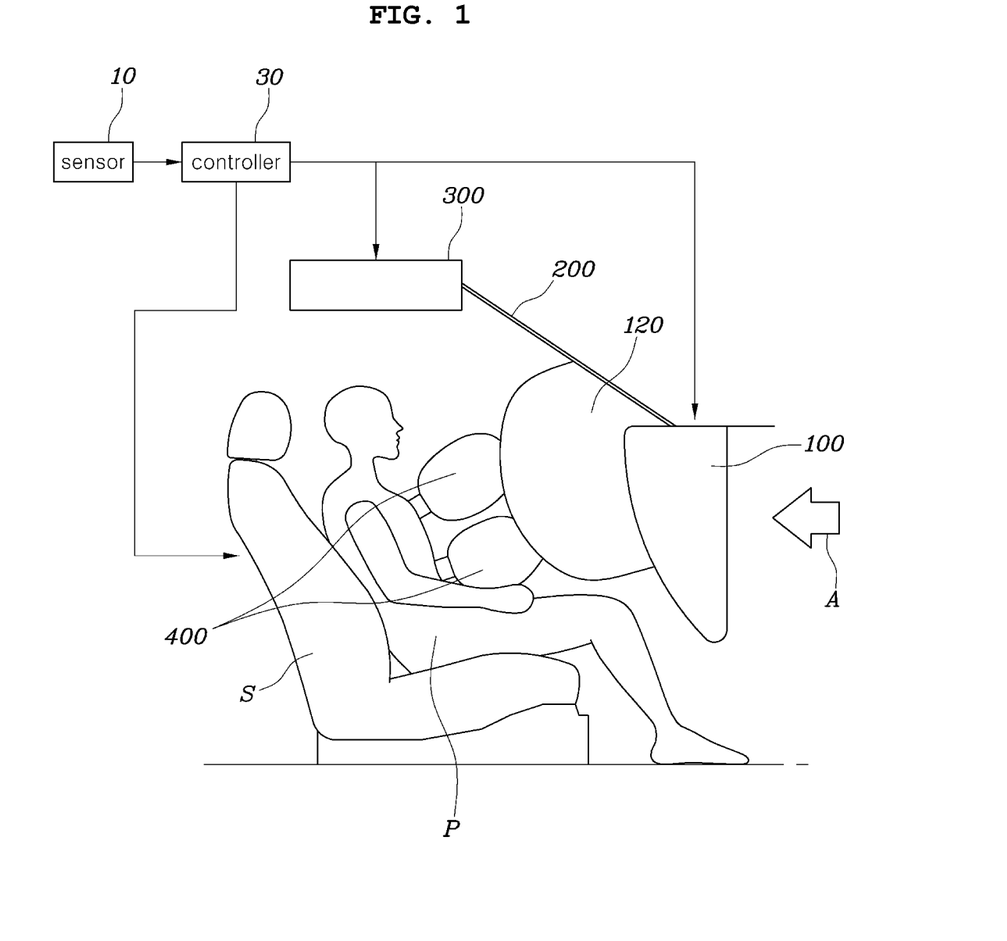
FIGS. 1 and 2 are diagrams illustrating a passenger protection system for a vehicle in one form of the present disclosure in a head-on collision mode.
Figure 2:
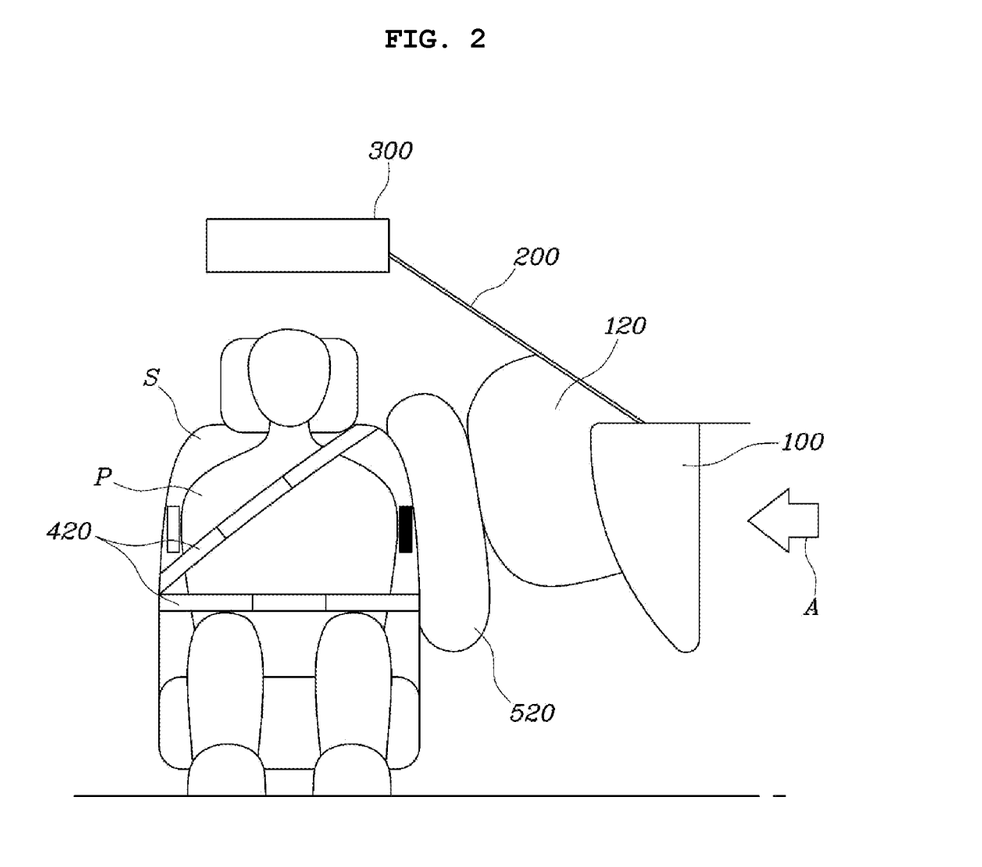
Figure 3:
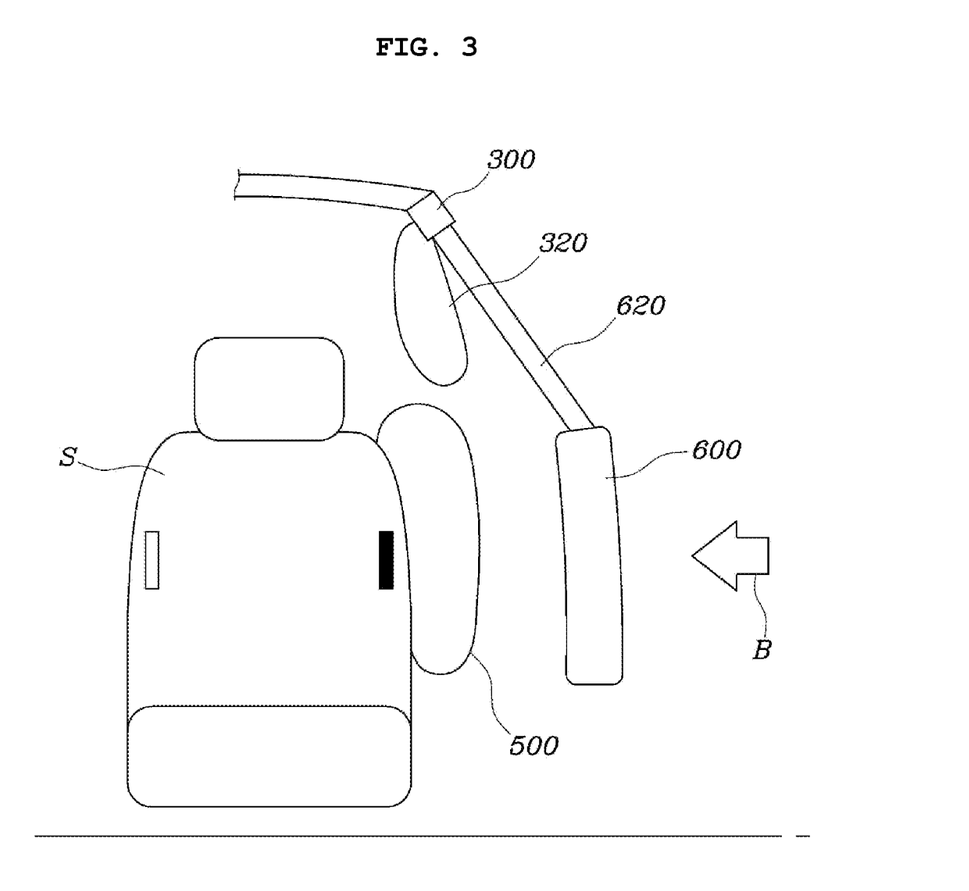
FIGS. 3 and 4 are diagrams illustrating the passenger protection system for the vehicle according to one form of the present disclosure in a side collision mode.
Figure 4:
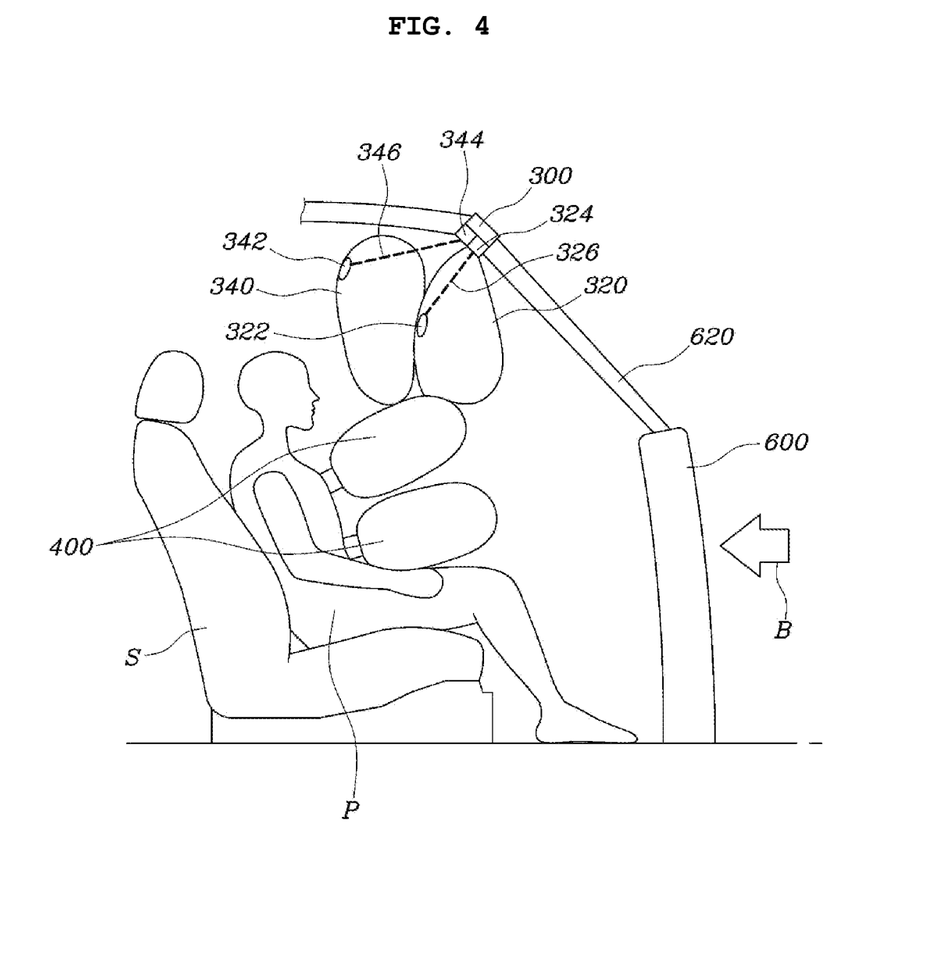
Figure 5:
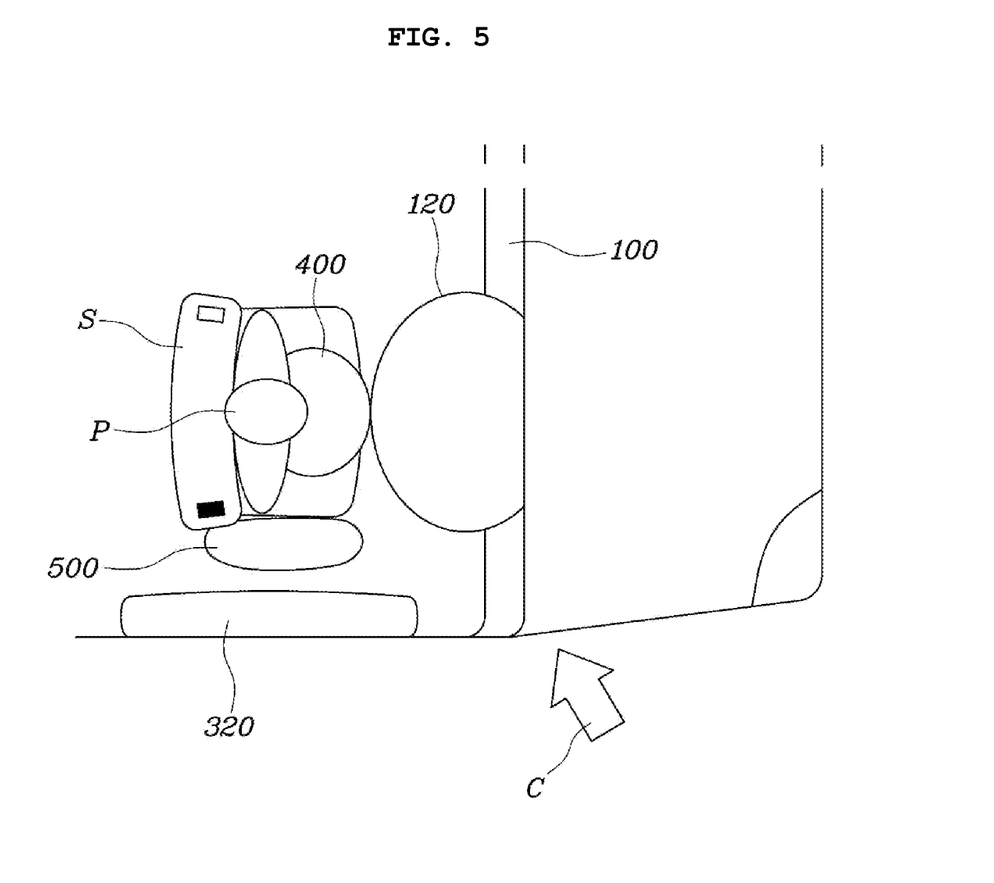
FIGS. 5 and 6 are diagrams illustrating the passenger protection system for the vehicle in one form of the present disclosure in an oblique collision mode.
Figure 6:
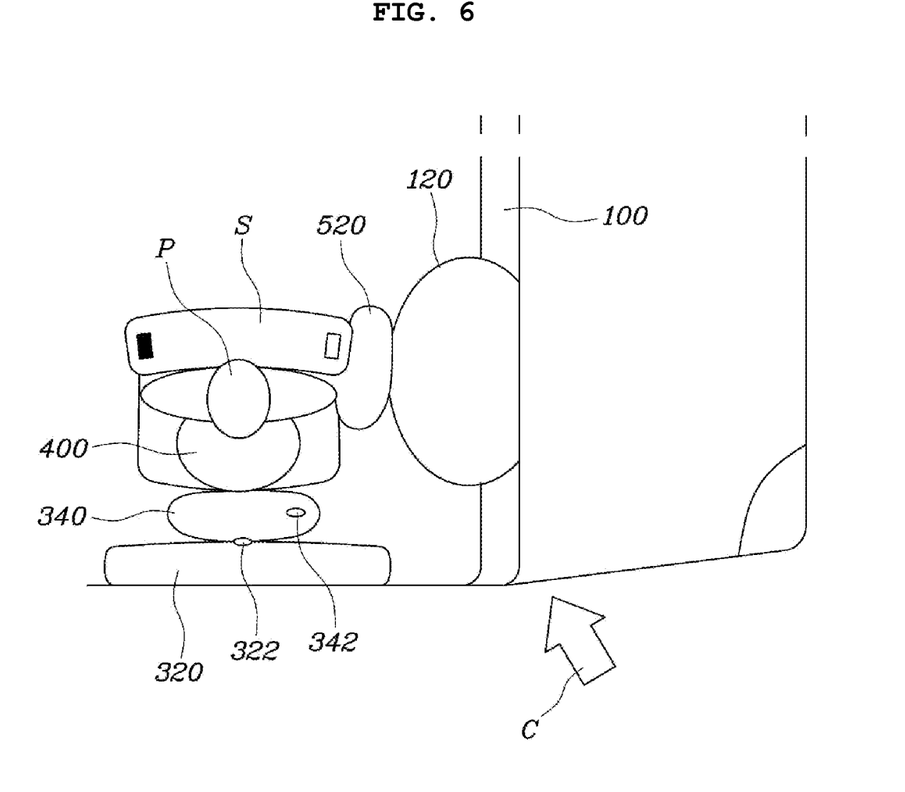
Figure 7:
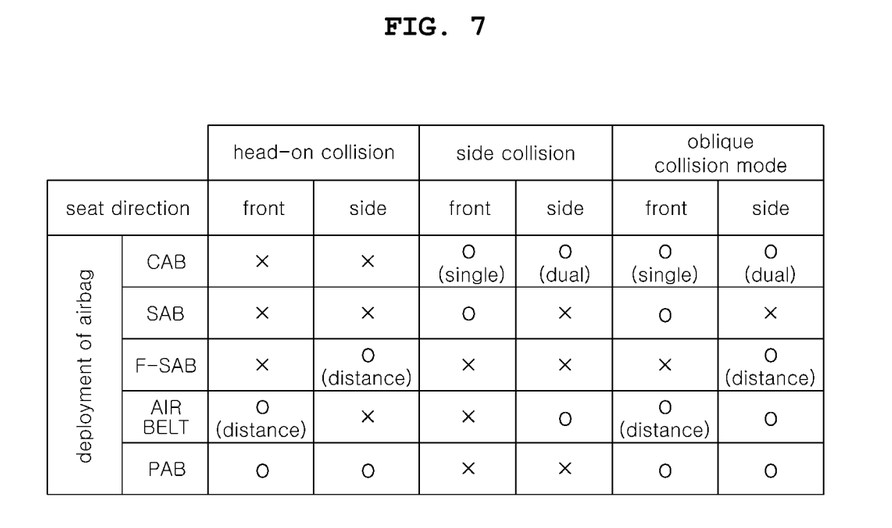
FIG. 7 is a table illustrating an operation of the passenger protection system for the vehicle according to one form of the present disclosure.

FIGS. 1 and 2 are diagrams illustrating a passenger protection system for a vehicle according to an exemplary form of the present disclosure in a head-on collision mode, FIGS. 3 and 4 are diagrams illustrating the passenger protection system for the vehicle according to one form of the present disclosure in a side collision mode, FIGS. 5 and 6 are diagrams illustrating the passenger protection system in an oblique collision mode, and FIG. 7 is a table illustrating an operation of the passenger protection system for the vehicle according to one form of the present disclosure.

The passenger protection system for the vehicle according to one form of the present disclosure may be applied to a conventional vehicle of which a seat S is rotatable as well as an autonomous vehicle. Furthermore, this system may be applied not only to a case where a crash sensor 10 directly detects the collision of the vehicle but also to a vehicle that predicts and controls the collision of the vehicle (pre-crash function) through sensors such as a camera or a radar.

To this end, the seat S of the passenger protection system for the vehicle according to one form of the present disclosure may slide forwards and backwards and rotate laterally. The seat S is provided with a seat belt 420 equipped with a belt airbag 400. In order to restrain a passenger via the belt 420 even when the seat S rotates, the belt 420 is not mounted to a pillar trim of the vehicle but should be integrally mounted to the seat S. Since the belt airbag 400 is provided in the seat belt 420, it is possible to more effectively protect a passenger. A conventional belt airbag 400 is based on a concept wherein an airbag cushion is inflated between the belt 420 and the passenger P so as to inhibit or prevent the belt from excessively restraining the passenger and thereby protect the passenger's chest from injury. By contrast, the present disclosure adopts the belt airbag 400 that is deployed to the front of the passenger P to more reliably protect the passenger P.

Furthermore, the seat S has a side airbag 500 on a side of a seatback of the seat. Based on a direction where the seat S is facing the front of the vehicle, the side airbag 500 is mounted on a side of the seatback adjacent to a vehicle door, while a far-side airbag 520 is mounted on an opposite side of the seatback. Generally, the far-side airbag 520 may be a side airbag that is mounted on a side opposite to the door so as to inhibit or prevent passengers from colliding with each other in the event of a side collision. However, the present disclosure causes the far-side airbag 500 to more reliably protect passengers under various conditions, in addition to performing the above-described function.

Furthermore, a front structure 100 located in front of the seat S of the vehicle is provided with a front airbag 120. Generally, the front airbag 120 is provided in a steering wheel or a crash pad. If seats are arranged in a plurality of rows, the front airbag may be provided in a rear surface of the seatback of a front seat, or in various vehicle structures. It should be understood that the front airbag 120 of the present disclosure embraces all airbags that are accommodated in various vehicle structures located in front of the seat and are inflated towards the seat when being deployed.

Meanwhile, a curtain airbag 300 is provided on a pillar trim on an upper end of the vehicle door to deploy downwards, thus inhibiting or preventing the passenger P from colliding with a door 600, a windshield 620 or the like.

A controller 30 is a module to integrally control all the airbags. This controller 30 may receive the sensing value of a motion sensor of the seat S, receive the sensing value of the crash sensor 10 of the vehicle, or receive the sensing value of various kinds of detection equipment (camera, radar, etc.) of the vehicle to predict the collision and control the vehicle in advance. Such a controller 30 may selectively deploy the belt airbag 400, the side airbag 500, the front airbag 120 and the curtain airbag 300, considering all the sliding position and rotating direction of the seat S and the detection of the vehicle collision or a predicted direction of the vehicle collision.

To be more specific, the belt airbag 400 is provided in each of a shoulder belt and a lap belt. When the belt airbag is deployed, an airbag cushion part may be inflated towards the front of the passenger P with respect to the belt 420. Thus, unlike the conventional belt airbag, the disclosure protects a passenger against shocks in addition to preventing the passenger from being injured by the belt, thus reliably restraining the passenger in cooperation with other airbags.

Moreover, the curtain airbag 300 may include a door-side chamber 320 located adjacent to a vehicle door, and a passenger-side chamber 340 disposed to overlap with a part of the door-side chamber which is on a passenger side. Furthermore, the passenger-side chamber 340 may be connected to the door-side chamber 320 via a connection hole 322, and may be inflated by gas supplied from the door-side chamber 320. That is, the door-side chamber 320 is supplied with gas from an inflator of the pillar trim to be deployed, and the passenger-side chamber 340 is supplied with gas from the door-side chamber 320 through the connection hole 322 to be inflated.

The connection hole 322 is connected to an active tether 326 and is kept closed by the tension of the active tether 326. The controller 30 selectively deploys the passenger-side chamber 340 by selectively releasing tension from the active tether 326 depending on the rotating direction of the seat, the detection of the vehicle collision or a predicted direction thereof when the curtain airbag 300 is deployed. Thereby, even when a distance between the passenger and the door is long, it is possible to effectively restrain a passenger by increasing the depth of the curtain airbag.

FIGS. 1 and 2 are diagrams illustrating the passenger protection system for the vehicle in one form of the present disclosure in the head-on collision mode. As illustrated in FIG. 1, the controller 30 may control to deploy the front airbag 120 when the seat is facing the front of the vehicle in a head-on collision (A) mode, and control to deploy the belt airbag 400 when a distance between the seat or the passenger on the seat and the front structure is more than a predetermined distance, or when a reclining angle of the seatback is more than a predetermined angle. The head-on collision mode embraces both a case where the head-on collision is detected and a case where the head-on collision is predicted. In this case, if the seat is facing the front, the controller 30 controls to deploy the front airbag 120 and thereby restrain a passenger at the front. However, if the distance between the seat or the passenger and the front structure is more than a predetermined distance, or when the reclining angle of the seatback is more than a predetermined angle, a passenger may not be sufficiently restrained by the volume or depth of the front airbag. In this case, the belt airbag 400 may be deployed together. Since the belt airbag 400 deploys to the front of the passenger P, the passenger P is sufficiently restrained by the belt airbag 400 and the front airbag 120.

As illustrated in FIG. 2, the controller 30 may deploy the front airbag 120 when the seat is facing the vehicle door in the head-on collision (A) mode, and deploy the far-side airbag 500 when the distance between the seat or the passenger and the front structure is more than a predetermined distance, or when the reclining angle of the seatback is more than a predetermined angle. In this case, since the passenger P faces the side of the vehicle, the far-side airbag 500 overlaps the front airbag 120 to restrain the passenger.

FIGS. 3 and 4 are diagrams illustrating the passenger protection system for the vehicle in one form of the present disclosure in the side collision (B) mode. As illustrated in FIG. 3, the controller 30 may control to deploy the curtain airbag 300 and the side airbag 500 when the seat is facing the front of the vehicle in the side collision mode. In this case, the curtain airbag 300 maintains the tension of the active tether to inhibit or prevent the passenger-side chamber from being deployed. When the tension of the active tether is maintained, the passenger-side chamber is not deployed but only the door-side chamber 320 is deployed. Thereby, it is possible to inhibit or prevent the curtain airbag 300 from excessively striking a passenger's head.

As illustrated in FIG. 4, the controller 30 deploys the curtain airbag 300 when the seat is facing the vehicle door 600 in the side collision (B) mode. The curtain airbag 300 may deploy both the passenger-side chamber 340 and the door-side chamber 320 by releasing the tension from the active tether through a tether cutter or the like. Thereby, it is possible to sufficiently restrain a passenger P who is far away from the door 600. Furthermore, in this case, the controller 30 controls to deploy the curtain airbag 300 and the belt airbag 400, thus filling a space between the door and the passenger and effectively restraining the passenger. In the case of the passenger-side chamber 340, an exterior vent hole 342 is formed to discharge gas when a passenger is loaded, thus preventing a secondary injury caused by the airbag. In order to more reliably realize it, it is possible to change a time when the exterior vent hole 342 is connected to the tether 346 and the tension of the tether 346 is released by a cutter 344 or the like, depending on a situation.

FIGS. 5 and 6 are diagrams illustrating the passenger protection system for the vehicle according to the form of the present disclosure in an oblique collision (C) mode. As illustrated in FIG. 5, the controller 30 deploys the front airbag 120, the curtain airbag 300 and the side airbag 500 when the seat S is facing the front of the vehicle in the oblique collision mode. In this case, when the distance between the seat or the passenger and the front structure is more than a predetermined distance, or when the reclining angle of the seatback is more than a predetermined angle, it is possible to effectively restrain a passenger by deploying the belt airbag 400 together.

As illustrated in FIG. 6, the controller 30 deploys the front airbag 120, the curtain airbag 300 and the belt airbag 400 when the seat is facing the vehicle door 600 in the oblique collision (C) mode. In this case, the controller 30 may control to deploy the front airbag 120, the curtain airbag 300 and the belt airbag 400, and simultaneously the curtain airbag 300 may cause both the passenger-side chamber 340 and the door-side chamber 320 to be deployed by releasing the tension from the active tether 326. Thereby, the passenger P is effectively restrained. Furthermore, when the distance between the seat or the passenger and the front structure is more than a predetermined distance or when the reclining angle of the seatback is more than a predetermined angle, the far-side airbag 500 is deployed together to restrain the passenger.

FIG. 7 is a table illustrating an operation of the passenger protection system for the vehicle according to the form of the present disclosure. The curtain airbag selectively employs a single mode or a dual mode in which only the door-side chamber is deployed or both the door-side chamber and the passenger-side chamber are deployed, thus more effectively restraining a passenger and protecting a passenger's head from being struck. Furthermore, the far-side airbag and the belt airbag are selectively deployed when a passenger is not sufficiently restrained by an existing airbag, for example, when the passenger is facing the door or in the relax mode, thus more effectively protecting the passenger.

As having described, the present disclosure provides a passenger protection system for a vehicle, which allows a passenger to be protected through various airbag apparatuses even when a seat of the vehicle is rotated or in a relax mode.

Although exemplary forms of the present disclosure have been described for illustrative purposes, those skilled in the art will appreciate that various modifications, additions and substitutions are possible, without departing from the scope and spirit of the disclosure.

What is claimed is:

1. A passenger protection system for a vehicle extending between forward and rearward directions, comprising:

a seat configured to slide in the forward and rearward directions and to rotate laterally, the seat including a seat belt equipped with a belt airbag;

a front airbag provided in a front structure located in front of the seat and configured to be deployed towards the seat;

a curtain airbag provided in a pillar trim on an upper end of a vehicle door and configured to be deployed downwards; and a controller configured to selectively deploy the belt airbag, the front airbag and the curtain airbag, based on a sliding position and a rotating direction of the seat as well as detection of a vehicle collision or a predicted direction of the vehicle collision, wherein, based on a direction where the seat faces a front of the vehicle, a side airbag is mounted on a side of a seatback of the seat adjacent to the vehicle door, and a far-side airbag is mounted on an opposite side of the seatback, wherein the controller is further configured to:
selectively deploy the belt airbag, the side airbag, the far-side airbag, the front airbag and the curtain airbag, based on the sliding position and the rotating direction of the seat as well as the detection of the vehicle collision or the predicted direction of the vehicle collision, deploy the front airbag when the seat is facing the side adjacent to the vehicle door in a head-on collision mode, and deploy the far-side airbag when a distance between the seat or a passenger on the seat and the front structure is greater than a predetermined distance, or when a reclining angle of the seatback is greater than a predetermined angle.

2. The passenger protection system according to claim 1, wherein the belt airbag is provided in each of a shoulder belt and a lap belt, and is deployed to cause an airbag cushion part to be inflated towards a front of a passenger with respect to the seat belt.

3. The passenger protection system according to claim 1, wherein the controller is configured to deploy the front airbag, the curtain airbag and the belt airbag when the seat is facing the vehicle door in an oblique collision mode, and to deploy the far-side airbag when a distance between the seat or a passenger on the seat and the front structure is greater than a predetermined distance, or when a reclining angle of the seatback is greater than a predetermined angle.

4. The passenger protection system according to claim 1, wherein the curtain airbag comprises a door-side chamber located adjacent to the vehicle door, and a passenger-side chamber disposed to overlap with a part of the door-side chamber which is on a passenger side.

5. The passenger protection system according to claim 4, wherein the passenger-side chamber is connected to the door-side chamber via a connection hole, and is inflated by gas supplied from the door-side chamber.

6. The passenger protection system according to claim 1, wherein the controller is configured to deploy the front airbag, the curtain airbag and the belt airbag when the seat is facing the vehicle door in an oblique collision mode.

7. A passenger protection system for a vehicle extending between forward and rearward directions, comprising:
a seat configured to slide in the forward and rearward directions and to rotate laterally, the seat including a seat belt equipped with a belt airbag;

a front airbag provided in a front structure located in front of the seat and configured to be deployed towards the seat;

a curtain airbag provided in a pillar trim on an upper end of a vehicle door and configured to be deployed downwards; and a controller configured to selectively deploy the belt airbag, the front airbag and the curtain airbag, based on a sliding position and a rotating direction of the seat as well as detection of a vehicle collision or a predicted direction of the vehicle collision, wherein:
the curtain airbag comprises a door-side chamber located adjacent to the vehicle door, and a passenger-side chamber disposed to overlap with a part of the door-side chamber which is on a passenger side, the passenger-side chamber is connected to the door-side chamber via a connection hole, and is inflated by gas supplied from the door-side chamber, and the connection hole is connected to an active tether and is kept closed by tension of the active tether, and the controller is configured to selectively deploy the passenger-side chamber by selectively releasing the tension from the active tether, based on the rotating direction of the seat and the detection of the vehicle collision or the predicted direction of the vehicle collision when the curtain airbag is deployed.

8. The passenger protection system according to claim 7, wherein the controller is configured to deploy the front airbag, the curtain airbag and the belt airbag when the seat is facing the vehicle door in an oblique collision mode, and the curtain airbag deploys both the passenger-side chamber and the door-side chamber by releasing the tension from the active tether.

9. The passenger protection system according to claim 7, wherein the controller is configured to deploy the curtain airbag and a side airbag provided on a side of a seatback of the seat when the seat is facing a front of the vehicle in a side collision mode, and the curtain airbag inhibits the passenger-side chamber from being deployed by maintaining the tension of the active tether.

10. The passenger protection system according to claim 7, wherein the controller is configured to deploy the curtain airbag when the seat is facing the vehicle door in a side collision mode, and the curtain airbag allows both the passenger-side chamber and the door-side chamber to be deployed by releasing the tension from the active tether.

11. The passenger protection system according to claim 10, wherein the controller is configured to deploy both the curtain airbag and the belt airbag when the seat is facing the vehicle door in the side collision mode.

12. A passenger protection system for a vehicle extending between forward and rearward directions, comprising:
a seat configured to slide in the forward and rearward directions and to rotate laterally, the seat including a seat belt equipped with a belt airbag;

a front airbag provided in a front structure located in front of the seat and configured to be deployed towards the seat;

a curtain airbag provided in a pillar trim on an upper end of a vehicle door and configured to be deployed downwards; and a controller configured to selectively deploy the belt airbag, the front airbag and the curtain airbag, based on a sliding position and a rotating direction of the seat as well as detection of a vehicle collision or a predicted direction of the vehicle collision, wherein the controller is configured to:
- deploy the front airbag when the seat is facing a front of the vehicle and the vehicle is in a head-on collision mode, and
- deploy the belt airbag when a distance between the seat or a passenger on the seat and the front structure is greater than a predetermined distance, or when a reclining angle of a seatback of the seat is greater than a predetermined angle.

13. The passenger protection system according to claim 12, wherein the controller is configured to deploy the front airbag, the curtain airbag and a side airbag provided on a side of the seatback of the seat when the seat is facing a front of the vehicle in an oblique collision mode, and configured to deploy the belt airbag when a distance between the seat or a passenger on the seat and the front structure is greater than a predetermined distance, or when a reclining angle of the seatback is greater than a predetermined angle.

* * * * *